United States Patent Office 3,124,729
Patented Mar. 10, 1964

3,124,729
METHOD FOR PREPARING SURFACES COMPRISING ISOTACTIC POLYPROPYLENE FOR PRINTING
Franco Ranalli, Milan, Italy, assignor to Montecatini Società Generale per l'Industria Mineraria e Chimica, a corporation of Italy
No Drawing. Filed May 13, 1958, Ser. No. 734,839
Claims priority, application Italy June 4, 1957
3 Claims. (Cl. 317—262)

This invention relates to a method for modifying the surface of articles made from polypropylene consisting prevailingly of isotactic macromolecules as defined by Natta et al. (see, e.g., JACS, March 20, 1955). More particularly, the invention relates to a method for rendering the surfaces of such articles receptive to printing compositions.

As is known, the use of articles made from thermoplastic resins has been considerably limited by the difficulties encountered in printing legends or decorations thereon and the fact that printing inks do not exhibit a sufficiently lasting adherence to the resins for practical purposes.

The lack of affinity for printing inks is a characteristic of the thermoplastic resins generally but is particularly pronounced in the case of the polypropylene consisting prevailingly of isotactic macromolecules recently disclosed by Natta et al. Those polymers are not only substantially non-porous but are also completely free of surface reactive groups capable of fixing substances which are chemically different from the polymers, such as printing inks and compositions comprising printing inks.

The prevailingly (at least 60%) isotactic polypropylenes of Natta et al. are characterized in that, assuming the main macromolecule chain to be fully extended in a plane, the —$CH_3$— groups attached to the asymmetric tertiary carbon atom of adjacent monomeric units are on one side of the plane, and the hydrogen atoms attached to those carbon atoms are on the opposite side of the plane. The isotactic polypropylenes are crystalline or crystallizable.

Those polymers can be molded to articles of various shapes and used in coating compositions, and have many important commercial uses.

Several methods for improving the adherence of printing compositions to the surface of articles formed from or comprising the isotactic polypropylene have been proposed. Such methods have all involved modification of the surface to be printed by means of chemical agents, heat, or irradiation.

The present invention provides an entirely new and different method for modifying surfaces comprising the polypropylene consisting prevailingly of isotactic macromolecules, to render the same receptive to printing inks which, when applied to the modified surfaces, adhere permanently to them.

In accordance with the invention, the surface comprising the isotactic polypropylene is modified and prepared for the application of printing inks thereto by subjecting it to a non-disrupting electric discharge between two or more electrodes while maintaining a suitable difference in potential between them.

It appears that, as a result of the action of the electric discharge, the propylene polymer comprising the isotactic structure is successively dehydrogenated and oxidized with the introduction into the polymer of a sufficient number of reactive oxygenated groups capable of reacting with the components of conventional printing inks. However, this is a theoretical explanation of the results we obtain and to which we do not wish to be bound.

In any case, we have established, by the common methods of determining the stability of printed legends and decorations, that the pre-treatment of articles, such as films, etc. as described above increases the adherence of the print to the modified surface to the extent that the print remains fixed on the surface substantially permanently.

One such test comprises subjecting the printed films, etc. to brisk rubbing. Another test to which we have subjected the printed films involves sticking the films on common adhesive paper tapes and then stripping the paper tape off vertically. This test leaves the printed matter applied to the pre-treated isotactic polypropylene surfaces essentially unaltered.

The following examples are given to illustrate specific embodiments of the invention, it being understood that these examples are not intended as limitative.

*Example 1*

A tape of highly isotactic (and crystalline) polypropylene was wound up on a rotating metal roll connected to ground. A 25 mm. wide brush consisting of a bundle of copper wires having a diameter of 0.5 mm., and fixed to the end of the electrode of a generator of 20,000 volts, was placed on the tape.

The voltage generator was set in action and, simultaneously, the roll having the tape windings was rotated at a peripheral speed of 3 m./min.

A bluish, non-disruptive discharge occurred between the brush and the surface of the polypropylene film. After two passes under the electrode, the film was printed with Kel-F ink.

Similar films of the same highly isotactic polypropylene were printed with the same ink, without pre-treatment.

After being dried, the two tapes were subjected to the rubbing and paper tape stripping tests mentioned above. A vast improvement was observed in the adherence of the ink to the tape which had been subjected to the electric discharge.

*Example 2*

A lamina of highly (about 85%) isotactic polypropylene having a thickness of 1.0 mm. was supported on a metal plate and a high voltage brush as described in Example 1 was passed over the lamina at constant speed.

After printing thereof, and in comparison with a similar lamina which had not been exposed to the electric discharge, the pre-treated film was found to have greatly increased receptivity for the printing ink.

Articles of various shapes and sizes made from or coated with the polymers of propylene consisting prevailingly of isotactic macromolecules, can be successfully prepared for printing by the present method.

The surfaces comprising the polypropylene show the greatly increased receptivity for conventional printing inks and compositions generally.

The Kel-F printing ink mentioned in Example 1 is a paste-like composition containing polymeric trifluorochloroethylene. Other printing inks which may be used include dispersions of pigments in high boiling solvents, inks containing linseed oil, driers and black pigments and which dry similarly to paints, inks of varnish type, and inks comprising thermoplastic resins e.g. of the vinyl type.

The polypropylene consists prevailingly of the isotactic macromolecules as defined, i.e. of linear, regular head-to-tail macromolecules in which, at least for long sections of the main chain, or for substantially the main chain, the tertiary asymmetric carbon atoms of successive monomeric units have the same steric configuration, but may comprise up to 30% of the Natta et al. linear, regular head-to-tail atactic polypropylene. As Natta et al. have shown the latter polymers are characterized in that, assuming the main macromolecule chain to be fully extended in a plane, the —$CH_3$— groups attached to the tertiary asymmetric carbon atoms of adjacent monomeric units, and the hydrogen atoms attached to those carbon atoms are randomly distributed on both sides of the plane. The Natta et al. polymers made up of the atactic macromolecules are non-crystallizable and, as shown by Natta et al., are produced simultaneously with the polymers made up of the isotactic macromolecules when propylene is polymerized with the aid of certain catalysts prepared from metallorganic compounds like aluminum triethyl and high valency halides of transition metals such as $TiCl_4$. The atactic polymers can be separated from the isotactic polymers on the basis of their different steric structures by means of selective solvents.

The polypropylene forming the articles or coatings which are prepared for printing as described herein may be obtained by separation of atactic polymers therefrom or it may be the polymerizate consisting prevailingly of the isotactic polypropylene and obtained directly by the Natta et al. selective polymerization method according to which propylene is polymerized with the aid of catalysts prepared directly from a metal alkyl, e.g., aluminum triethyl, and a solid, substantially crystalline low valency halide of certain transition metals, for instance $TiCl_3$.

The polypropylene may also comprise some partially isotactic polymer, i.e., polymers the macromolecule chain of which comprises inseparable isotactic and atactic sections or blocks.

Since various changes may be made in details in practicing the invention without departing from the spirit thereof, we intend to include in the scope of the appended claims all such modifications as may be apparent to those skilled in the art.

What is claimed is:
1. A process for increasing the receptivity to printing inks of sheet material formed of a polypropylene consisting prevailingly of isotactic macromolecules and comprising the steps of supporting the sheet material on a grounded metal roll, maintaining a brush electrode at a voltage lower than the voltage which would cause disruption of the sheet material, and passing the sheet material under the brush electrode in contact therewith at a controlled speed to subject the surface to a continuous non-disrupting electrical charge whereby the receptivity of the polypropylene at said surface to printing ink is increased.

2. A process for increasing the receptivity to printing inks of sheet material formed of a polypropylene consisting prevailingly of isotactic macromolecules and comprising the steps of supporting the sheet material on a grounded metal roll, placing an electrode in contact with the surface of the sheet material, and applying a voltage of the order of about 20,000 volts to said electrode while moving the sheet material therebeneath in contact therewith at a controlled speed to subject the surface to a continuous non-disrupting electrical charge whereby the receptivity of the polypropylene at said surface to printing ink is increased.

3. A sheet formed of a polypropylene consisting prevailingly of isotactic macromolecules, said sheet being characterized in that the polypropylene at the surface of the sheet has increased receptivity for printing inks as compared to the receptivity normally possessed by said polyproylene, and further characterized in being obtained by supporting the sheet on a metal roll connected to ground and passing a brush electrode having a voltage lower than the voltage which would cause disruption of the sheet over the surface of the sheet away from the metal roll and in contact with said surface, whereby said surface is subjected to a continuous non-disrupting electric discharge.

References Cited in the file of this patent

UNITED STATES PATENTS

| | | |
|---|---|---|
| 2,173,741 | Wise | Sept. 19, 1939 |
| 2,648,097 | Kritchever | Aug. 11, 1953 |
| 2,774,921 | Walkup | Dec. 18, 1956 |
| 2,802,085 | Rothacker | Aug. 6, 1957 |
| 2,810,933 | Pierce et al. | Oct. 29, 1957 |
| 2,879,396 | McDonald | Mar. 24, 1959 |
| 2,882,412 | Cunningham | Apr. 14, 1959 |
| 2,934,649 | Walkup | Apr. 26, 1960 |
| 2,935,418 | Berthold et al. | May 3, 1960 |